United States Patent [19]

Gerdes et al.

[11] Patent Number: 4,680,633

[45] Date of Patent: Jul. 14, 1987

[54] CIRCUIT AND METHOD FOR PRODUCING ACCURATE DC RESTORED VIDEO WAVEFORM, HORIZONTAL SYNC PULSES, AND VERTICAL SYNC PULSES

[75] Inventors: Richard C. Gerdes; Peter R. Vokac, both of Tucson, Ariz.

[73] Assignee: Third Domain, Inc., Tucson, Ariz.

[21] Appl. No.: 726,624

[22] Filed: Apr. 24, 1985

[51] Int. Cl.⁴ .................. H04N 5/04; H04N 5/16
[52] U.S. Cl. ................................ 358/171; 358/154
[58] Field of Search ............... 358/34, 36, 148, 153, 358/154, 155, 157, 166, 167, 171, 177, 172, 173; 307/542, 351, 555; 330/11

[56] References Cited

U.S. PATENT DOCUMENTS

| 4,097,896 | 6/1978 | Avery | 358/153 |
| 4,233,629 | 11/1980 | Dayton | 258/153 |
| 4,254,435 | 3/1981 | Dayton et al. | 358/154 |
| 4,387,396 | 6/1983 | Tanaka et al. | 358/154 |
| 4,516,042 | 5/1985 | Nakamura | 307/555 |
| 4,550,342 | 10/1985 | Buchanan et al. | 358/153 |

FOREIGN PATENT DOCUMENTS

| 0029108 | 3/1977 | Japan | 358/155 |
| 0050116 | 4/1977 | Japan | 358/154 |
| 0089613 | 8/1978 | Japan | 358/154 |
| 0021636 | 2/1980 | Japan | 358/155 |
| 0080064 | 5/1984 | Japan | 358/153 |

OTHER PUBLICATIONS

Roland J. Turner; DC Restorer for Video Use Offers Ultra Stability, 12/73; pp. 114-115; Electronics, 178-7.3 DC.

Primary Examiner—Tommy P. Chin
Attorney, Agent, or Firm—Cahill, Sutton & Thomas

[57] ABSTRACT

A composite video signal is input to a DC restore circuit and a sync separator circuit, the output of which is connected to a sync decoder circuit. The DC restore circuit includes a negative sensing peak sample and hold circuit that generates a first reference voltage equal to the sync tip voltage. A first differential amplifier substracts the composite video signal from the reference voltage and produces an inverted, level shifted replica, the sync tip voltage of which is zero. A second differential amplifier having an output clamping circuit, in conjunction with a comparator, produces a composite sync voltage that is used to strobe a sample and hold circuit to produce a second reference voltage. The replica is inverted by a second differential amplifier that subtracts the replica from the second reference voltage to produce the DC restored video signal, a "back porch" portion of which is accurately referenced to zero volts.

17 Claims, 7 Drawing Figures

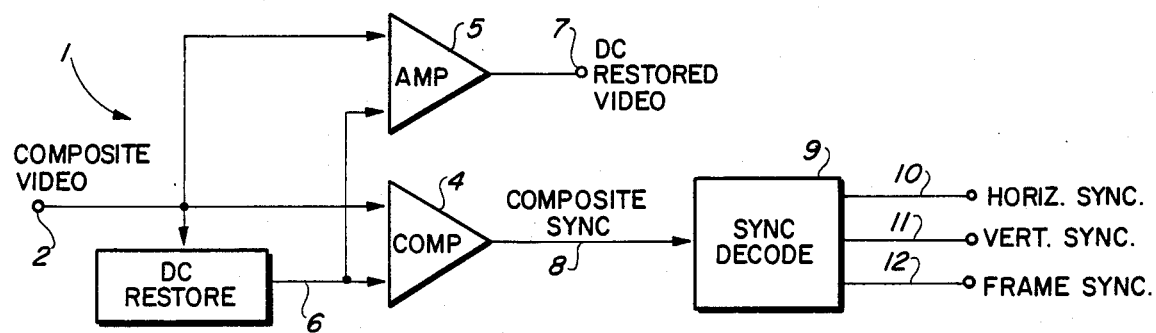
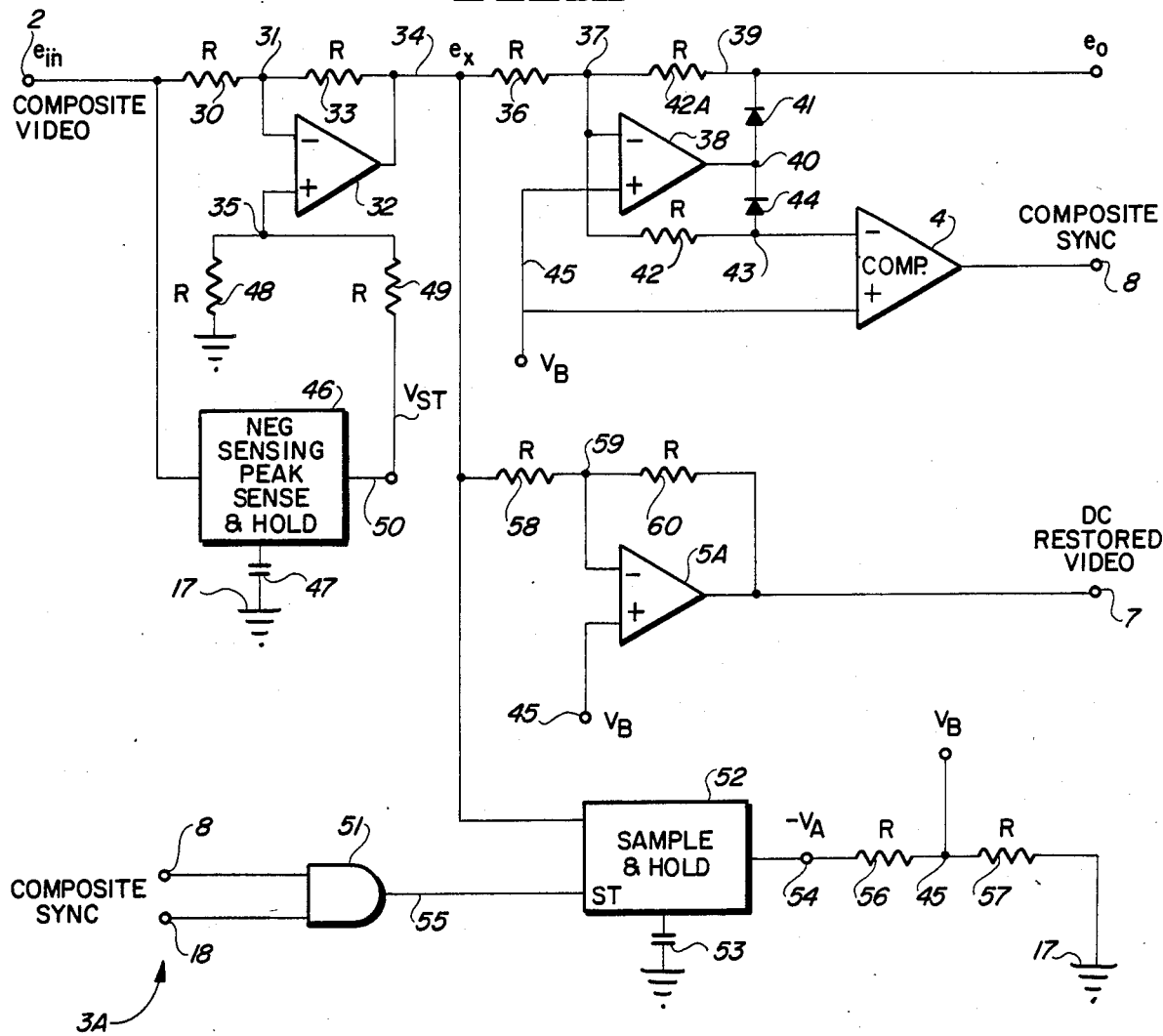

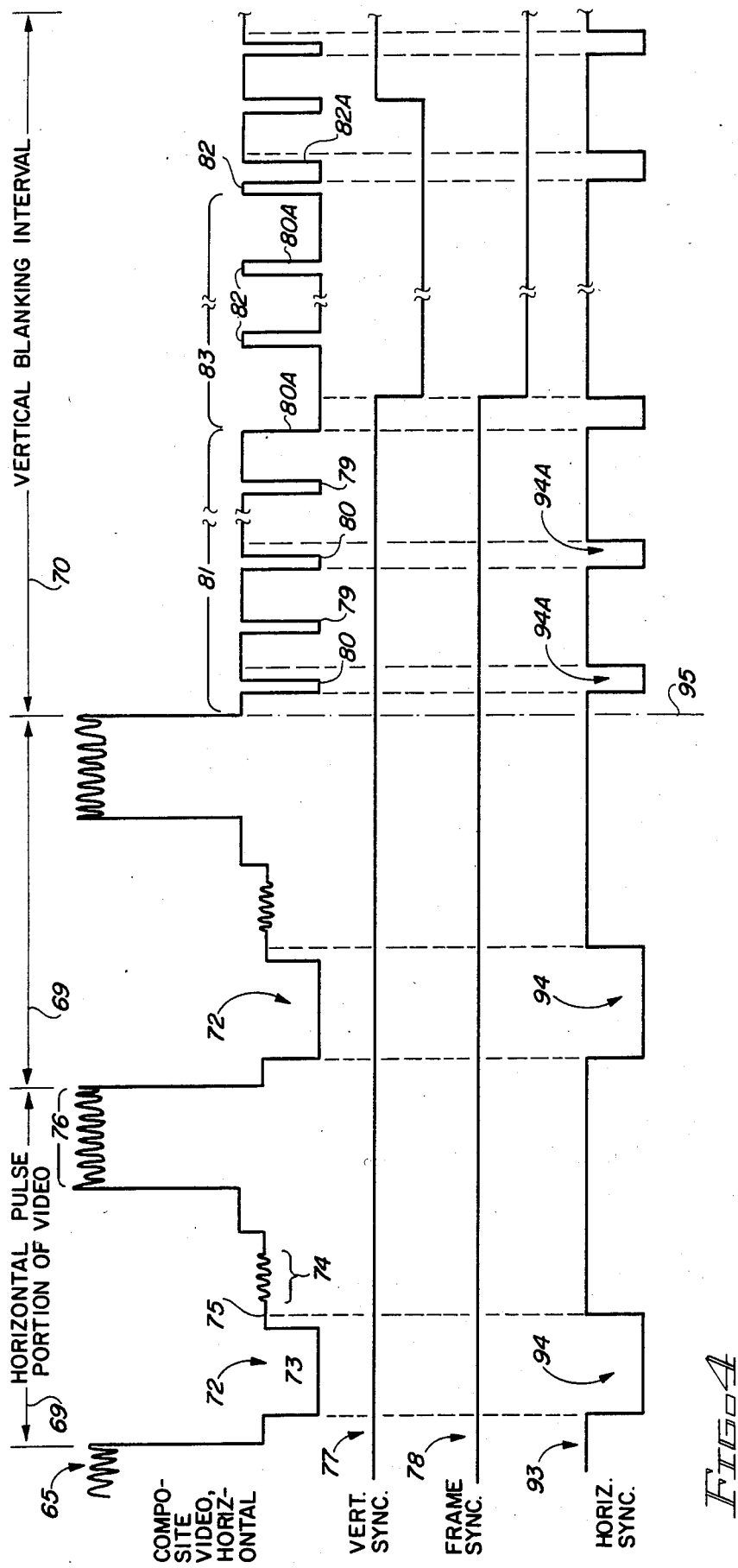

CIRCUIT AND METHOD FOR PRODUCING ACCURATE DC RESTORED VIDEO WAVEFORM, HORIZONTAL SYNC PULSES, AND VERTICAL SYNC PULSES

BACKGROUND OF THE INVENTION

The invention relates to DC restore circuits and to sync decode circuits that operate on composite video signals, and particularly to improvements in such circuits to avoid distortion associated with prior DC restore circuits and to produce horizontal and vertical sync pulses more accurately than prior sync decoder circuits by avoiding signal jitter associated therewith.

Composite video signals typically include a considerable amount of AC noise. Such AC noise can make it very difficult to separate the horizontal and vertical synchronization information needed to produce a CRT (cathode ray tube) video display, and also can make it difficult to generate a DC restored composite video signal, horizontal sync pulses, and vertical sync pulses as accurately as is desirable for high resolution screen displays, especially if the video signal is weak. Those skilled in the art know that composite video signals lose their reference voltage levels when they are transmitted through space to a receiver, or are recovered from magnetic media by means of a read head during playback. A stable reference must be re-created by a technique referred to as DC restoration. Some prior DC restoration circuits capacitively couple the composite video signal to a diode clamping circuit having its anode connected to ground and its cathode connected to one terminal of the coupling capacitor. In such DC restore circuits, the sync tip gets clamped to a voltage equal to one diode drop below ground, thereby establishing or restoring a reference level to the sync tip. This technique works well for non-critical applications in which there is a reasonably strong video signal level and not too much noise. However, shifts in the noise level, in the video signal strength, or in the sync tip amplitude can result in severe distortions in the DC restored signal produced by such prior circuits. Another prior circuit is referred to as a "back porch clamp" or a "sync tip clamp". This type of circuit, although more complex than the one first described, and less subject to variations in the sync tip amplitude, typically is based on diode clamping to establish the sync tip level, and produces severe distortions in the resulting DC restored signal when high levels of noise are present relative to the video signal. There remains an unfulfilled need for an improved technique for producing a DC restored signal which is a precise replica of the composite video waveform.

Prior art sync decoders typically apply the stripped video signal, i.e., the composite sync signal to an RC integrating circuit in the process of producing the vertical sync pulse, and apply the same composite sync signal to an RC differentiating circuit to produce the horizontal sync pulse signal. The resulting integrated and differentiated signals then are used to trigger Schmitt trigger circuits. The presence of noise on the composite sync waveform produces variations in the slopes of the integrated and differentiated waveforms, producing "jitter" of the times at which the Schmitt trigger circuits are triggered, and thereby producing "jitter" (with respect to time) of the horizontal and vertical sync pulses, especially the latter. The jitter usually is unacceptable for applications in which high resolution images are required, or if images are to be digitized stored, and further processed. Therefore, there remains an unmet need for an improved technique for generating jitter-free horizontal and vertical sync pulses from a composite video waveform.

SUMMARY OF THE INVENTION

It is an object of the invention to provide an improved DC restore circuit that avoids distortion associated with typical prior DC restore circuits.

It is another object of the invention to provide a sync decoder circuit that avoids signal jitter associated with typical prior sync decoder circuits.

It is another object of the invention to provide an improved circuit for receiving a composite video signal and producing a very accurate, distortion-free DC restored video signal and also producing more accurate horizontal sync and vertical sync pulses than has been possible with prior circuitry.

Briefly described, and in accordance with one embodiment thereof, the invention provides circuitry for producing a very precise, undistorted DC restored composite video signal, a composite sync signal obtained by separating horizontal and vertical sync information from the composite video signal, and producing a sync decoding operation on the composite sync signal to produce jitter-free horizontal sync, vertical sync, and frame sync signals. The DC restore circuitry applies the composite video signal to a negative sensing peak sample and hold circuit to generate a negative DC first reference voltage that is equal to or representative of the voltage of the sync tip portion of the composite video signal. That first reference voltage is applied to the positive input of a first differential amplifying circuit, the negative input of which is coupled to the composite video signal. The first differential amplifier substracts the composite video signal from the first DC reference voltage to produce an inverted composite video signal, the sync tip of which is shifted up by the first reference voltage, i.e., to precisely zero volts. The inverted composite video signal is applied to a sample and hold circuit that is strobed during a "back porch" portion of the composite video signal in order to produce a negative second DC reference voltage equal to or representative of the amplitude of the sync tip of the inverted composite video signal. The inverted composite video signal is applied to the negative input of a second differential amplifier, the positive input of which is coupled to the second DC reference voltage, and the output of which produces a "DC restored" replica of the original composite video signal by inverting the inverted composite video signal and shifting the voltage of the "back porch" portion thereof downward by an amount equal to the amplitude of the sync tip portion of the inverted composite video signal. This has the effect of precisely referencing the back porch portion of the DC restored video signal to zero volts. The distortion associated with diode clamping video restore circuits of the prior art is thereby avoided. The inverted composite video signal also is applied to a third differential amplifier circuit that uses a polarity splitting output circuit to separate the negative sync pulses of the composite video from the video portion thereof. The separated sync portion is input it to a level-shifting comparator in order to produce a composite sync signal that is accurately referenced to ground. The composite sync signal is applied to a first monostable multivibrator, which produces a one-shot pulse of duration that is greater than the widths of the horizontal pulses and pre-equalization pulses of the composite sync signal, but is less than the intervals between the serration pulses thereof. The output of the first monostable multivibrator is applied to clock a first first D-type latch, the input of which is connected to receive the composite sync signal. The output of the first D-type latch produces the "one" level of the composite sync signal during the pre-equalization portion of the vertical blanking interval. When the composite sync signal makes its transition to its vertical sync pulse interval, the "zero" level of the composite sync signal is latched or clocked into the first D-type latch by a negative transition of the first monostable multivibrator when it times out. The transition between the pre-equalization portion of the vertical blanking interval and the vertical sync pulse interval thereof is thereby precisely detected when the first monostable multivibrator "times out". This operation produces a jitter-free detection of the vertical sync pulse signal transition. The output of the first monostable multivibrator is applied to the input of a second monostable multivibrator, the output of which is connected to one input of a NAND circuit, the other input of which is connected to the output of the first monostable multivibrator. The horizontal pulses of the composite sync pulse signal thereby are gated through the NAND gate to produce jitter-free horizontal sync pulses.

The output of the first D-type latch is used to latch the output of the second monostable multivibrator into a second D-type latch in order to produce a jitter-free frame sync signal.

BRIEF DESCRIPTION OF THE DRAWINGS

FIG. 1 is a block diagram of the video circuit of the present invention.

FIG. 2 is a detailed circuit schematic diagram of the DC restorer and sync stripping portion of the circuit of FIG. 1

FIG. 4 includes diagrams of a composite video waveform, a vertical sync waveform, and a frame sync waveform which are useful in explaining the operation of the invention.

DESCRIPTION OF THE INVENTION

Figure 3:
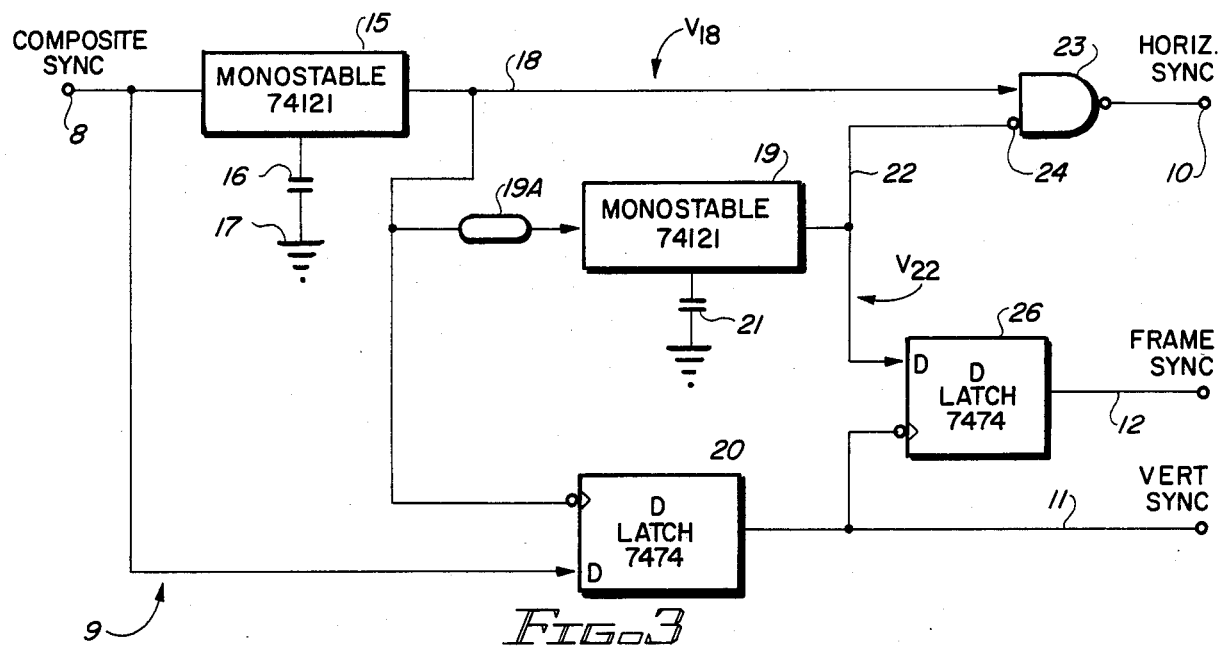
FIG. 3 is a circuit schematic diagram of the sync decode portion of FIG. 1.

Referring first to FIG. 1, reference numeral 1 designates a generalized block diagram of a circuit to which an unreferenced composite video signal, such as signal 65 in FIG. 4, is applied. One purpose of the circuit 1 is to produce a DC restored video signal on conductor 7, which DC restored video signal is an accurate replica of the unreferenced input composite video signal. Circuit 1 also produces an accurate horizontal sync pulse on conductor 10, an accurate vertical sync pulse on conductor 11, and a frame sync signal on conductor 12.

Figure 5:
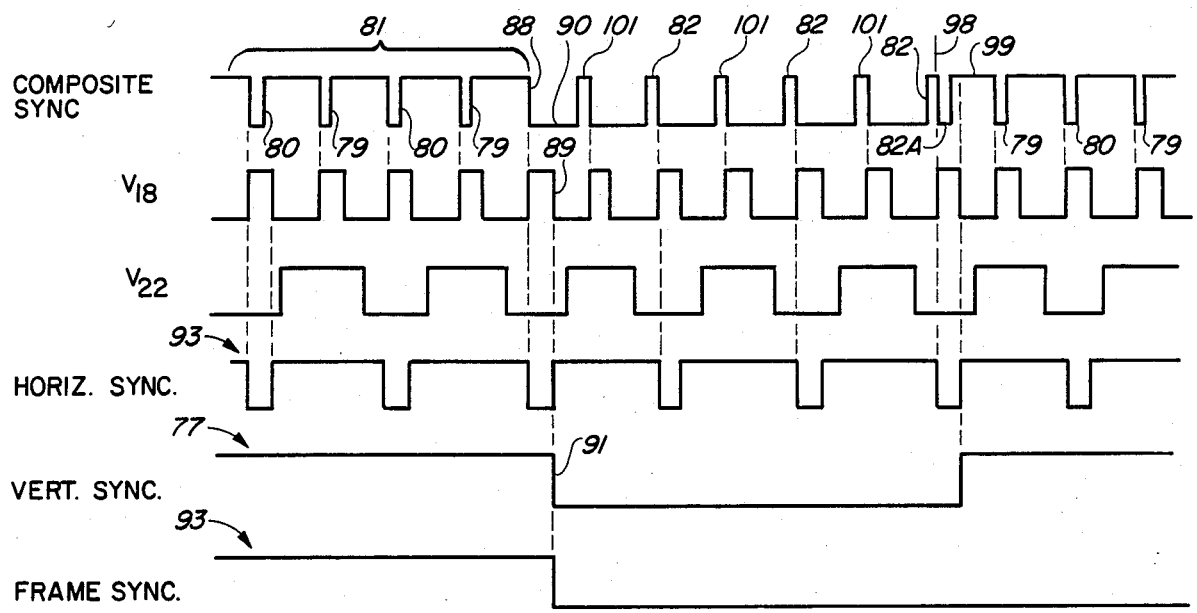
FIG. 5 includes waveforms that are useful in describing the operation of the circuit of FIG. 3.

Video circuit 1 includes a DC restore circuit 3 having its input connected to conductor 2 and an output connected to conductor 6. The composite video input conductor 2 is also connected to one input of differential amplifier 5. Conductor 6 is connected to both the other input of comparator 4 and the other input of differential amplifier 5. The output of differential amplifier 5 is connected to conductor 7, on which the desired DC restored video signal is produced. The output of comparator 4 is connected to conductor 8, on which a composite sync pulse, as shown in FIG. 5, is produced. Conductor 8 is applied to the input of a sync decode circuit 9, which produces the horizontal sync, vertical sync, and frame sync waveforms on conductors 10, 11, and 12.

Referring now to FIG. 2, reference numeral 3A designates a circuit of the present invention which includes the improved DC restore circuit 3, differential amplifier 5, and comparator 4 of FIG. 1. The unreferenced composite video signal, also designated by $e_{in}$, is applied by conductor 2 to one terminal of a resistor 30, and also to an input of a negative-sensing peak sample and hold circuit 46. A capacitor 47 is connected between a terminal of negative-sensing peak sense and hold circuit 46 and ground conductor 17, and performs the function of storing the sensed level. Various negative-sensing peak sense and hold circuits are known in the art. For example, a negative-sensing peak sample and hold circuit that can be used is a PKD-01, manufactured by Precision Monolithics, Inc. or various available positive sensing peak sense and hold circuits such as a 5030A manufactured by Optical Electronics, Inc. preceded by a unity gain differential amplifier, can be used.

Figure 6:
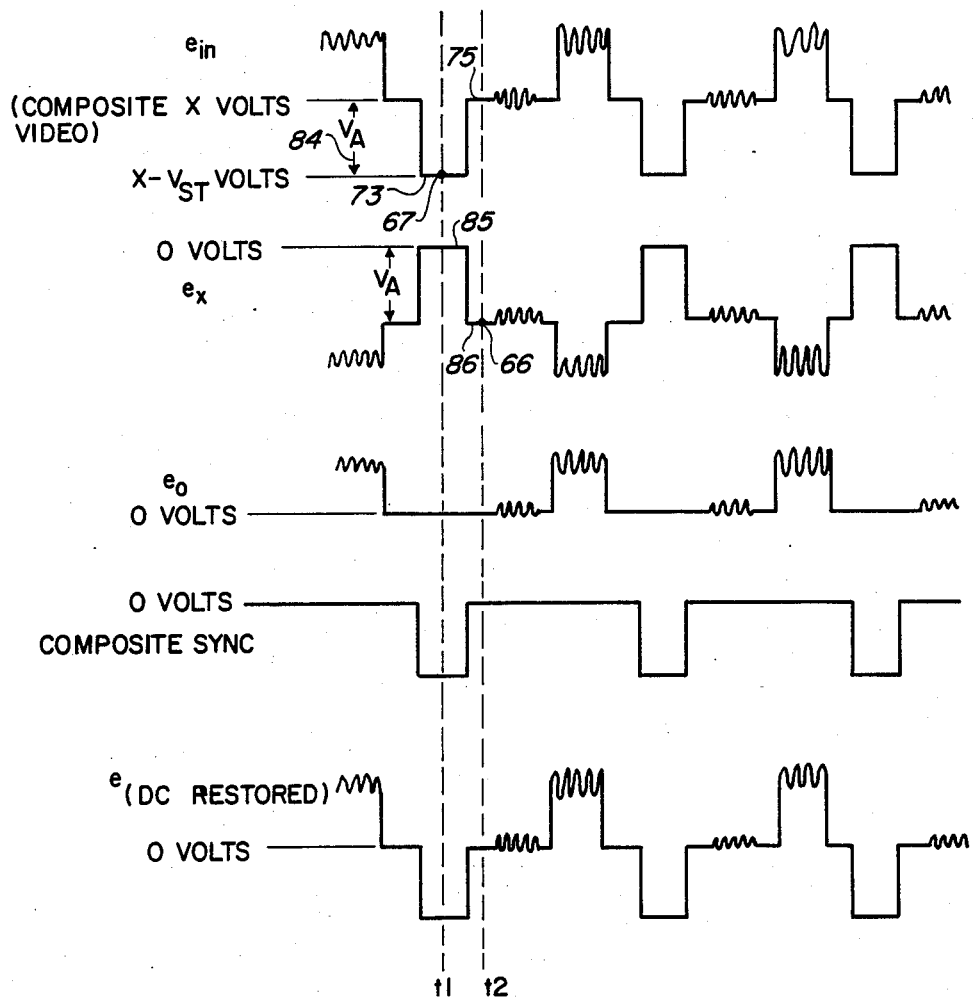
FIG. 6 includes waveforms that are useful in describing the operation of the circuit of FIG. 2.

The output of negative-sensing peak sense and hold circuit 46 is applied to conductor 50, on which a DC voltage $V_{ST}$ is produced. $V_{ST}$ is equal to the voltage level 73 of the negative sync tip portion of the unreferenced composite video waveform $e_{in}$, as shown in FIG. 6. Conductor 50 is coupled by resistor 49 to conductor 35. Resistor 48 is coupled between ground and conductor 35. Resistive divider circuit 48, 49 divides $V_{ST}$ by two.

Resistor 30 is coupled between $e_{in}$ conductor 2 and conductor 31. Conductors 31 and 35 are connected to the negative and positive inputs, respectively, of an operational amplifier 32. A feedback resistor 33 is coupled between conductor 34 and conductor 31. The output of operational amplifier 32 also is connected to conductor 34 also. A voltage $e_x$ (FIG. 6) is produced on conductor 34.

Conductor 34 is connected to one terminal of a resistor 36, the other terminal of which is connected to conductor 37. Conductor 37 is connected to the negative input of operational amplifier 38 and is also coupled by resistor 42 to conductor 43. The output of operational amplifier 38 is connected to conductor 40. Conductor 40 is connected to the anode of clamping diode 41 and to the cathode of clamping diode 44. The cathode of diode 41 is connected by conductor 39 to one terminal of resistor 42A, the other terminal of which is connected to conductor 37. A stripped video output voltage $e_o$ (FIG. 6) is produced on conductor 39.

Conductor 43 is connected to the positive input of comparator 4. The output of comparator 4 is connected to conductor 8, on which the composite sync waveform (FIG. 6) is produced. The negative input of operational amplifier 38 is connected to conductor 45, on which a reference voltage $V_B$ is produced, as subsequently explained. Conductor 45 is connected to the positive input of comparator 4.

The composite sync voltage on conductor 8 is applied to one input of a two input AND gate 51. The other input of AND gate 51 is connected to conductor 18. Conductor 18 is connected to the output of a monostable multivibrator 15, subsequently described with reference to FIG. 3. The output of AND gate 51 is connected to conductor 55, which is connected to the strobe (ST) input of a sample and hold circuit 52. A capacitor 53 connected between sample and hold circuit 52 and ground performs the function of storing the sampled level. The sample input of sample and hold circuit 52 is connected to conductor 34 to receive the $e_x$ signal. The output of sample and hold circuit 52 is connected to conductor 54, on which a negative voltage $V_A$, equal to the amplitude of the sync tip portion 73 of the composite video signal $e_{in}$ (FIG. 6), is produced. Conductor 54 is coupled by resistor 56 to conductor 45, on which the above-mentioned negative reference voltage $V_B$ is produced. Conductor 45 is coupled by resistor 57 to ground conductor 17.

Conductor 34 is coupled by resistor 58 to conductor 59, which is connected to the negative input of operational amplifier 5A. The positive input of operational amplifier 5A is connected to $V_B$ conductor 45. Conductor 59 is coupled by resistor 60 to the output conductor 7 of amplifier 5A, on which the desired DC restored composite video signal is produced.

Referring next to Fig. 3, the improved sync decode circuit 9 of Fig. 1 includes a monostable multivibrator 15 having its input connected to composite sync conductor 8. The duration of the monostable state of multivibrator 15 is determined by capacitor 16, which is connected between it and ground conductor 17. The output of monostable multivibrator 15 is connected by conductor 18 to one input of NAND gate 23, and through delay 19A to the input of a second monostable multivibrator 19, and the clock input of a D-type latch 20. The D input of latch 20 is connected to composite sync conductor 8. The output of latch 20 is connected to conductor 11, on which the vertical sync pulse is produced.

The duration of the unstable state of monostable multivibrator 19 is determined by capacitor 21. The output of monostable multivibrator 19 is connected by conductor 22 to an inverting input 24 of NAND gate 23 and the D input of a second latch 26. The clock input of latch 26 is connected to conductor 11. The output of D-type latch 26 is connected to conductor 12, on which the frame sync pulse is produced.

The output of NAND gate 23 is connected to conductor 10, on which the horizontal sync pulse is produced.

Monostable multivibrators 15 and 19 of FIG. 3 can be implemented by 74121TTL integrated circuits. D-type latches 20 and 26 can be implemented by means of 7474TTL integrated circuit D-type latches. NAND gate 23 can be implemented by means of an ordinary two input NAND gate and an ordinary inverter, which inverter is represented by circle 24, and is connected between one input of the ordinary NAND gate and conductor 22. However, logic gates having both an inverting and a non-inverting input are known to those skilled in the art.

The sample and hold circuit 52 in FIG. 2 can be provided by those skilled in the art, and can, for example, be an HTS0010 integrated circuit, manufactured by Analog Devices. Comparator 4 can be an LM360 integrated circuit, manufactured by National Semiconductor. Operational amplifiers 5A, 32, and 38 can be VOA901 integrated circuits, manufactured by Third Domain, the present Assignee. All of the resistors in FIG. 2 are equal, and can have, as an exemplary value, a resistance in the range of 1 to 10 kilohms.

Now that the structure of the improved video circuit of the present invention has been described, its operation will be described with reference to the waveforms of FIGS. 4, 5, and 6. First, it will be convenient to refer to several conventional features of a composite video signal, designated by reference numeral 65 in FIG. 4. The composite video signal 65 includes a sequence of horizontal durations 69, each of which corresponds to a separate line scanned on a CRT (cathode ray tube) display. When the beam has scanned from the upper left-hand corner of the screen to the lower right-hand corner thereof, the sequence of horizontal durations is interrupted by a duration 70 referred to as the "vertical blanking interval". During this vertical blanking interval, the CRT beam returns from the lower right-hand corner of the screen to the upper left-hand corner.

The horizontal durations 69 of FIG. 4 each are characterized by a negative-going horizontal sync pulse 72, the lowest level 73 of which is referred to as the "horizontal sync tip". The horizontal sync pulse 72 is followed by a "color burst" 74, for color systems. The voltage level 75 is commonly referred to as the "back porch", or "blanking level". The portion of each horizontal pulse portion of the composite video signal designated by reference numeral 76 contains all of the video information for one horizontal line scan of the CRT beam.

The circuit 1 of FIG. 1 needs to accurately produce a DC restored video signal that is precisely referenced to electrical ground, and also needs to produce "jitter-free" vertical sync pulses, horizontal sync pulses, and frame sync pulses if a high peformance, high resolution video display is to be obtained. In FIG. 4, reference numeral 77 generally designates a typical vertical sync signal, and reference numeral 78 designates a frame sync signal.

The vertical blanking interval 70 includes a plurality of alternate pre-equalization pulses 79 and a plurality of "horizontal" pulses 80 therebetween, all of which pulses are negative-going. After the pre-equalization period designated in FIG. 4 by reference numeral 81 is finished, there is a "transition" in the vertical blanking interval 70, to a waveform configuration 83 in which there are a plurality of positive-going serration pulses 82.

The "horizontal" timing represented by the negative-going edges of the horizontal pulses 72 continues through the vertical blanking interval. Note, however, that in FIG. 4, the horizontal time scale to the left of time change axis 95 is compressed, for convenience of illustration. Reference numeral 80A in FIG. 4 designates the negative-going edges of the serration pulses 82. The negative-going edges 80A define the beginnings of the corresponding horizontal sync pulses. Reference numeral 83 defines the "vertical sync pulse interval" portion of the vertical blanking interval 70. Note that the horizontal sync waveform 93 in FIG. 4 includes horizontal sync pulses 94 before the time change axis 95 and identical horizontal sync pulses 94A after or to the right of time change axis 95. Monostable multivibrator 19 has the characteristic that the voltage on capacitor 21 ramps upward after the input is triggered, and produces an output pulse that has a high level between the times of occurence of the one volt and three volt levels on capacitor 21. These levels correspond to the one-quarter and three-quarter points of the period of the horizontal sync waveform 93 of FIGS. 4 and 5.

The transition between pre-equalization region 81 and the vertical sync pulse interval defines the beginning of the negative-going vertical sync pulse 77, and, if an interlaced display is being used, the same transition also defines the beginning of the negative-going frame sync pulse 78. As previously mentioned, the prior art approaches to producing vertical sync pulses and the horizontal sync pulses result in instability or "jitter" in the transition times of the horizontal sync pulses and the vertical sync pulses, which jitter limits the performance of high resolution displays.

Referring now to FIG. 2, and also to FIG. 6 (which shows the $e_{in}$ composite video waveform, the $e_x$ waveform on conductor 34, the $e_o$ waveform on conductor 39, and the composite sync waveform on conductor 8) the negative-sensing peak sample and hold circuit 46 simply produces the voltage $-V_{ST}$ level of the horizontal sync tip 73 (FIG. 6) on conductor 50. This voltage is divided by two by the resistive divider circuit 48, 49 and is applied to the positive input of operational amplifier 32.

Those skilled in the art know that the circuit configuration including operational amplifier 32 and resistors 30, 33, 48, and 49 functions as an inverting differential amplifier with a gain of unity, with the above-indicated resistor values. Therefore, the differential amplifier subtracts $e_{in}$ from $V_{ST}$. Consequently, it can be seen that at the time $t_1$ in FIG. 6, $e_x$ is equal to zero, and at $t_2$ $e_x$ is equal to $-e_{in}$ (which is equal to $-V_A$), as indicated by reference numeral 84 of the $e_{in}$ waveform of FIG. 6. Thus, at $t_2$, $e_x$ is equal to $-V_A$.

The signal $e_x$ is inverted by the differential amplifier including operational amplifier 5A, resistors 58 and 60, and a reference voltage $V_B$ on conductor 45 in order to produce the DC restored video signal on conductor 7. This amplifier acts as a unity gain inverting differential amplifier, assuming that resistors 56 and 57 are included therein. As subsequently explained, the sample and hold circuit 52 generates the reference voltage $V_B$, which produces a DC "correction" that causes the "back porch" level 75 to be established precisely at zero volts.

The above analysis indicates that the $e_x$ waveform, as drawn in FIG. 6, has its sync tip voltage level 85 at zero volts. Therefore, in the $e_x$ waveform, the back porch level 86 is at $-V_A$ volts. When $e_x$ is inverted by amplifier 5A, it is necessary to bring the back porch level from $+V_A$ volts back down to zero volts in order to get the desired DC restored video signal.

In order to accomplish this, the back porch level 86 is sampled by sample and hold circuit 52 at time $t_2$ by strobing sample and hold circuit 52. To strobe sample and hold circuit 52 at $t_2$, AND gate 51 logically ANDs the composite sync and $V_{18}$ waveforms of FIG. 5 to produce a narrow positive strobe pulse on conductor 55 immediately following the positive-going edge of each composite sync pulse. That this occurs can be seen by noting the time that both the composite sync signal and $V_{18}$ waveforms in FIG. 5 are both at a high level. This produces $-V_A$ on conductor 54, and thereby produces the voltage $V_B$, which is equal to one-half of $V_A$, on conductor 45.

In FIG. 2, the sync separating or sync "stripping" function is performed by the amplifier consisting of operational amplifier 38, resistors 36, 42, and 42A, and diodes 41 and 44, and comparator 4. This amplifier structure performs an inverting function, and has a gain of unity. Diode 41 permits only positive signals to be included in $e_o$, and eliminates all of the horizontal sync pulse, pre-equalization pulses, horizontal pulses, serration pulses, and post-equalization pulses information from the $e_x$ signal to produce the stripped video $e_o$ signal. Diode 44 performs the opposite function, i.e., it removes all of the video information from $e_x$, so that a composite sync pulse is produced on conductor 43. The level thereof is then shifted by comparator 4 to produce the desired composite sync signal on conductor 8.

Those skilled in the art will be able to see that the circuit of FIG. 2 produces a very accurate composite sync pulse, and that the dc restored video signal on conductor 7 is not subject to any of the distortion characteristic of the prior art dc restorer circuits.

Referring now to FIG. 3, and also to the waveforms of FIG. 5 (including the composite sync signal applied to conductor 8 of the sync decode circuit 9, the voltages $V_{18}$ and $V_{22}$ on conductors 18 and 22, respectively, and the horizontal sync, vertical sync, and frame sync signals produced on conductors 10, 11, and 12, respectively), the operation of the sync decoder 9 of the present invention will be described.

Basically, the vertical sync pulse on conductor 11 is produced by adjusting monostable multivibrator 15 so that it has a "time-out" period greater than the width of any of the pre-equalizing pulses 79 and horizontal pulses 80 of the composite sync waveform, but less than any of the intervals between the serration pulses 82.

A typical value of the output pulse $V_{18}$ produced on conductor 18 by monostable multivibrator 15 is about 7 microseconds.

Note that during the pre-equalization interval 81 of the composite sync pulse, the voltage on conductor 8 (which is applied to the D input of latch 20) is high between pulses 79 and 80. Since the D-type latch 20 is activated by a negative-going transition on its clock input, the vertical sync pulse on conductor 11 remains high during the pre-equalization interval 81. However, after negative-going transition 88 of the composite sync waveform (FIG. 5), the composite sync waveform is at a low level during the next negative-going transition 89 of $V_{18}$. This causes the low level 90 of the composite sync waveform to be latched into D-type latch 20, causing its output conductor 11 to go rapidly (without any jitter) from a high level to a low level, as indicated by reference numeral 91. This mode of operation continues during the vertical sync pulse interval 83, shown in FIG. 4.

When the composite video signal 65 of FIG. 4 undergoes the negative transition 98 (FIG. 5), this marks the end of the vertical sync pulse interval 83 (FIG. 4). The composite sync waveform undergoes a corresponding positive transition, causing the resulting high level 99 (FIG. 5) to be clocked into D-type latch 20 (FIG. 3), thereby causing the vertical sync pulse to go from a low level to a high level (without any instability).

Monostable multivibrator 19 produces an output pulses $V_{22}$ on conductor 11, each having a width of approximately 190 microseconds. Monostable multivibrator 19 inhibits the alternate half line pulses 79 and 101. Logical NANDing of these two signals, as indicated in FIG. 3, produces the horizontal sync pulse on conductor 25.

If interlaced horizontal scanning is being used, the vertical sync pulse begins in the "even" field at the end of a horizontal line, but occurs in the middle of a horizontal line for the "odd" field. Therefore, when the vertical sync pulse on conductor 11 goes low, it clocks D-type latch 26. If $V_{22}$ is low at the negative transition of conductor 11, then the output on conductor 12 will be latched at a low level, indicating that the present field is the odd numbered one. However, if the present field is the even numbered one, the transition is in the middle of a horizontal line, so $V_{22}$ is high when the vertical sync pulse on conductor 11 undergoes its negative transition 91. This will cause ahigh level to be latched into D-type latch 26, causing the frame sync output to go to a high level, indicative that the next field to be scanned is the even numbered one.

The above techniques improve the stability of the vertical sync, horizontal sync, and frame sync signals produced by prior art sync decoding techniques, by avoiding converting noise-caused amplitude variations in the composite video signal from being converted to corresponding time variations that are inherent in the prior art techniques of differentiating and intergating the composite video signal and using the resulting waveforms to trigger digital circuits.

Figure 7:
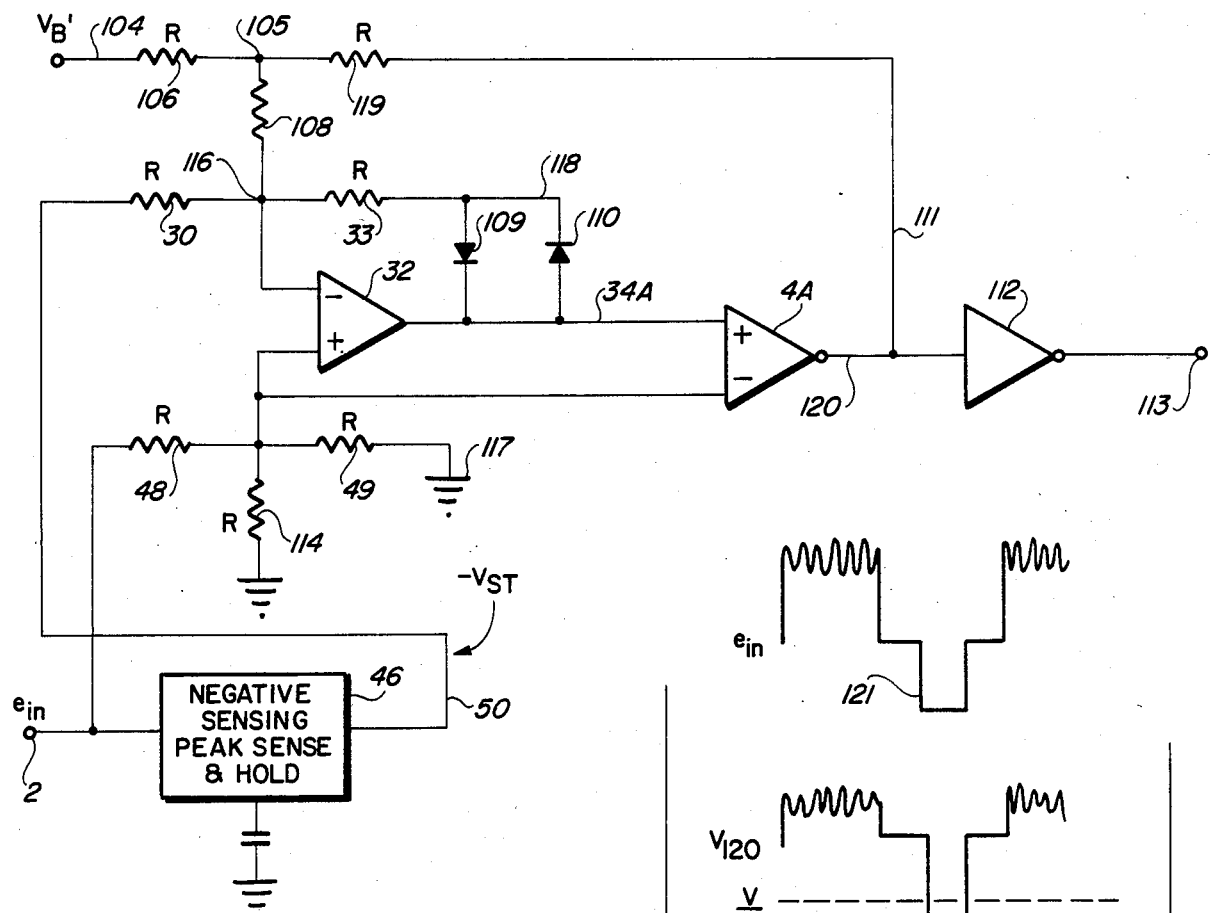
FIG. 7 is a circuit schematic diagram of a different DC restore circuit than the ones shown in FIG. 2.

An alternate DC restore circuit is shown in FIG. 7. This DC restore circuit does not produce an inverted replica (such as $e_x$) of the composite video signal, as occurs in the DC restore circuit shown in FIG. 2. In FIG. 7, $e_{in}$ is applied by conductor 2 to the input of negative-sensing peak sense and hold circuit 46, similarly to the operation in the circuit of FIG. 2. $e_{in}$ is also applied to a voltage dividing circuit including equal resistors 48, 49, and 114, which divide the composite video signal $e_{in}$ by 3 and apply it to the inverting input of comparator 4A and the non-inverting input of operational amplifier 32.

Negative-sensing peak sense and hold circuit 46 produces the voltage $-V_{ST}$ on conductor 50, as previously described with reference to FIG. 2, and applies $-V_{ST}$ to one terminal of resistor 30, the other terminal of which is connected to conductor 116. An externally generated reference voltage $V'_b$ is applied by conductor 104 to one terminal of resistor 106. The other terminal of resistor 106 is connected by conductor 105 to resistor 119 and to resistor 108. The other terminal of resistor 108 is connected to conductor 116, which is also coupled by resistor 33 to conductor 118. Conductor 116 is also connected to the negative input of operational amplifier 32. The output of operational amplifier 32 is connected by conductor 34A to the positive input of inverting comparator 4A, the cathode of diode 109, and the anode of diode 110. Conductor 118 is connected to the cathode of diode 110 and the anode of diode 109. The inverting output of comparator 4A is connected by conductor 120 to the other terminal of resistor 119, thereby providing positive feedback to the non-inverting input of operational amplifier 32. A TTL inverter 112 produces TTL signals on conductor 113.

The externally generated reference voltage $V'_B$ is selected to establish a midpoint reference voltage on conductor 116 for the differential amplifier including equal resistors 30, 33, 108, 48, 49, and 114. The output voltage $-V_{ST}$ of negative-sensing sense and hold circuit 46 then automatically adjusts the reference voltage on conductor 116 in accordance with the negative sync tip level of the incoming composite video signal. During the time $t_1$ (see FIG. 6), the voltage on conductor 118 is zero volts, and during $t_2$, $V_{118}$ is equal to $V_A$, which is the sync tip amplitude indicated in the composite video waveform of FIG. 4.

Figure 8:
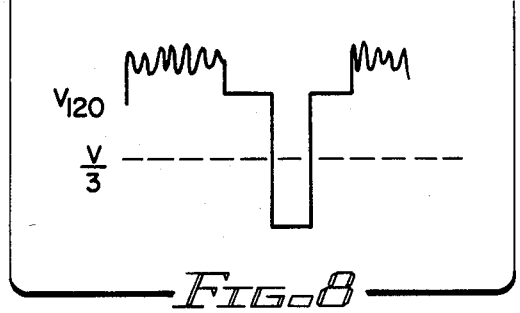
FIG. 8 is a diagram showing waveforms that are useful in describing the circuit of FIG. 7.

For values of $e_{in}$ at which the voltage on conductor 117 is approximately equal to the voltage on conductor 34A and conductor 116, diodes 109 and 110 will be off. Operational amplifier 32 then will be in its very high gain state during negative-going transitions such as 121 (FIG. 8) of the composite video signal $e_{in}$. However, if either of the diodes 109 or 110 is forward biased, then the differential amplifier has essentially unity gain. Thus, the circuit shown in FIG. 7 produces a DC restored composite video signal on conductor 34A with a greatly amplified or "stretched" sync tip portion, if the sync tip amplitudes of the incoming composite video waveform have deteriorated to very low levels. Therefore, the DC restore circuit of FIG. 7 produces a DC restored sync signal on conductor 118 with steep negative-going pulses. The signal on conductor 118 is used to generate the composite sync pulse on conductor 120 with no "time jitter", even though the amplitudes of the sync tips of the incoming composite video signal may be very deteriorated and may therefore have substantial slopes that are significantly effected by "amplitude jitter." The circuit of FIG. 7, prevents such "amplitude jitter" from being converted into corresponding "time jitter" of the composite sync signal, the vertical and horizontal sync signals derived from the composite sync signal.

While the invention has been described with reference to a particular embodiment thereof, those skilled in the art will be able to make various modifications to the described embodiment without departing from the true spirit and scope of the invention.

We claim:

1. A method of operating a video circuit comprising the steps of:
   (a) applying a first signal, which is a composite video signal, to a negative input of a first differential amplifier and to an input of a negative sensing peak sense and hold circuit, to produce a first DC reference voltage that is equal to the negative sync tip voltage of the first signal;
   (b) applying the first DC reference voltage to the positive input of the first differential amplifier to cause the first differential amplifier to produce a second signal that is an inverted replica of the first signal and has its level shifted so that the voltage of a sync tip portion of the second signal is equal to a ground reference voltage;
   (c) applying the second signal to a negative input of a second differential amplifier;
   (d) sensing the voltage of the second signal during a back porch portion thereof and producing a second DC reference voltage representative of the voltage of the back porch portion of the second signal;
   (e) applying the second DC reference voltage to the positive input of the second differential amplifier and a fraction of the second DC voltage to the positive input of a comparator;
   (f) coupling the output of the second differential amplifier through a diode to the negative input of the comparator to cause the comparator to produce a composite sync signal containing a series of narrow negative going pulses during a pre-equalization portion thereof followed by a plurality of narrow serration pulses during a vertical sync pulse interval portion thereof;

(g) applying the composite sync signal to a first monostable multivibrator and to an input of a first latch;

(h) causing an output of the first monostable multivibrator to produce pulses which are wider than the narrow negative-going pulses during the pre-equalization period of the composite sync signal but narrower than the interval between the serration pulses; and (i) clocking the first latch with a trailing edge of the output pulses produced by the first monostable multivibrator in order to produce a jitter-free vertical sync signal that undergoes a jitter-free transition in response to a transition between the pre-equalization portion and the vertical sync pulse interval portion of the composite sync signal.

2. The method of claim 1 including applying the output of the first monostable multivibrator to the input of a second monostable multivibrator that produces output pulses wider than the output pulses produced by the first monostable multivibrator, and performing a logical ANDing function on the output of the second monostable multivibrator and the output of the first monostable vibrator to produce a jitter-free horizontal sync signal.

3. The method of claim 2 including applying the vertical sync signal to the clock input of a second latch and applying the output of the second monostable multivibrator to the input of the second latch to produce a jitter-free frame sync signal.

4. The method of claim 3 wherein the first and second latches are D-type latches.

5. The method of claim 3 wherein the logical ANDing step includes applying the output of the first monostable multivibrator and the logical complement of the output of the second monostable multivibrator to the input of a circuit that performs a logical NANDing function to inhibit half line pulses of the composite sync signal and to thereby produce the horizontal sync signal.

6. The method of claim 3 wherein the width of the pulses produced by the first monostable multivibrator is greater than incoming horizontal pulse widths is less than about three-fourths of a the duration of a horizontal line.

7. The method of claim 3 wherein step (d) includes applying the second signal to an input of a sample and hold circuit and strobing the sample and hold circuit by performing a logical AND operation on the composite sync signal and the output of the first monostable multivibrator.

8. The method of claim 1 including applying the second DC reference voltage to the positive input of a third differential amplifier and coupling the second signal to a negative input of the third differential amplifier to produce a DC restored video signal wherein the voltages of its back porch portions have a fixed relationship to the ground reference voltage.

9. A method of operating a video circuit comprising the steps of:

(a) applying a first signal, which is a composite video signal, to a negative input of a first differential amplifier and to an input of a negative sensing peak sense and hold circuit, to produce a first DC reference voltage that is equal to the negative sync tip voltage of the first signal;

(b) applying the first DC reference voltage to the positive input of the first differential amplifier to cause the first differential amplifier to produce a second signal that is an inverted replica of the first signal and has its level shifted so that a sync tip voltage portion of the second signal has a fixed relationship to a ground reference voltage;

(c) applying the second signal to a negative input of a second differential amplifier;

(d) sensing the voltage of the second signal during a back porch portion thereof to produce a second DC reference voltage equal to the voltage of the back porch portion of the second signal;

(e) applying the second DC reference voltage to the positive input of the second third differential amplifier; and (f) applying the second signal to the negative input of the second differential amplifier to produce a DC restored composite video signal having its back porch portions at precisely the ground reference voltage.

10. A video circuit comprising:

(a) a first differential amplifier;

(b) a negative-sensing peak sense and hold circuit;

(c) means for applying a first signal, which is a composite video signal, to a negative input of the first differential amplifier and an input of the negative-sensing peak sense and hold circuit to cause the negative-sensing peak sense and hold circuit to produce a first DC reference voltage that is equal to the negative sync tip voltage of the first signal;

(d) means for applying the first DC reference voltage to the positive input of the first differential amplifier to cause the first differential amplifier to produce a second signal that is an inverted replica of the first signal and has its level shifted so that the voltage of a sync tip portion of the second signal is equal to a ground reference voltage;

(e) a second differential amplifier;

(f) means for applying the second signal to a negative input of a second differential amplifier;

(g) means for sensing the voltage of the second signal during a back porch portion thereof and producing a second DC reference voltage representative of the voltage of the back porch portion of the second signal;

(h) a comparator;

(i) means for applying the second DC reference voltage to the positive input of the second differential amplifier and a fraction of the second DC voltage to the positive input of a comparator;

(j) means for coupling the output of the second differential amplifier through a diode to the negative input of the comparator to cause the comparator to produce a composite sync signal containing a series of narrow negative going pulses during a pre-equalization portion thereof followed by a plurality of narrow serration pulses during a vertical sync pulse interval portion thereof;

(k) a first monostable multivibrator and a first latch;

(l) means for applying the composite sync signal to a first monostable multivibrator and causing an output of the first monostable multivibrator to produce pulses which are wider than the narrow negative-going pulses during the pre-equalization period of the composite sync signal but narrower than the interval between the serration pulses; and (m) means for clocking the first latch with a trailing edge of the output pulses produced by the first monostable multivibrator in order to produce a jitter-free vertical sync signal that undergoes a jitter-free transition in response to a transition between the pre-equalization portion and the vertical sync pulse interval portion of the composite sync signal.

11. The video circuit of claim 10 including a second monostable multivibrator and means for applying the output of the first monostable multivibrator to the input of a second monostable multivibrator and causing it to produce output pulses wider than the output pulses produced by the first monostable multivibrator, and means for performing a logical ANDing function on the output of the second monostable multivibrator and the output of the first monostable vibrator to produce a jitter-free horizontal sync signal.

12. The video circuit of claim 11 including a second latch and means for applying the vertical sync signal to the clock input of the second latch and applying the output of the second monostable multivibrator to the input of the second latch to produce a jitter-free frame sync signal.

13. The video circuit of claim 12 wherein the first and second latches are D-type latches.

14. The video circuit of claim 12 wherein the logical ANDing means includes means for applying the output of the first monostable multivibrator and the logical complement of the output of the second monostable multivibrator to the input of a circuit that performs a logical NANDing function to inhibit half line pulses of the composite sync signal and to thereby produce the horizontal sync signal.

15. The video circuit of claim 12 wherein the width of the pulses produced by the first monostable multivibrator is greater than incoming horizontal pulse widths is less than about three-fourths of a the duration of a horizontal line.

16. The video circuit of claim 12 wherein the sensing means includes a sample and hold circuit and means for applying the second signal to an input of a sample and hold circuit and strobing the sample and hold circuit by performing a logical AND operation on the composite sync signal and the output of the first monostable multivibrator.

17. The video circuit of claim 10 including a third differential amplifier and means for applying the second DC reference voltage to the positive input of the third differential amplifier and means for coupling the second signal to a negative input of the third differential amplifier to produce a DC restored video signal wherein the voltages of its back porch portions have a fixed relationship to the ground reference voltage.

* * * * *